United States Patent [19]
Doi et al.

[11] Patent Number: 5,499,323
[45] Date of Patent: Mar. 12, 1996

[54] VOLUME RENDERING METHOD WHICH INCREASES APPARENT OPACITY OF SEMITRANSPARENT OBJECTS IN REGIONS HAVING HIGHER SPECULAR REFLECTIVITY

[75] Inventors: Akio Doi, Machida; Koji Koyamada, Hatano; Tatsuo Miyazawa, Tokyo, all of Japan

[73] Assignee: International Business Machines Corporation, Armonk, N.Y.

[21] Appl. No.: 260,590

[22] Filed: Jun. 16, 1994

[30] Foreign Application Priority Data

Jun. 16, 1993 [JP] Japan ................................. 5-144459

[51] Int. Cl.⁶ .................................................. G06T 15/50
[52] U.S. Cl. ............................ 395/126; 395/124; 395/131
[58] Field of Search ...................................... 395/119, 120, 395/124, 126, 129, 130–132

[56] References Cited

U.S. PATENT DOCUMENTS

| | | | |
|---|---|---|---|
| 5,222,203 | 6/1993 | Obata | 395/126 |
| 5,363,477 | 11/1994 | Kuragano et al. | 395/126 |

OTHER PUBLICATIONS

Nayar, Shree K. et al, "Surface Reflection: Physical and Geometric Perspectives," *IEEE Transactions on Pattern Analysis & Machine Intelligence*, pp. 611–634, (1991).

Park, Jong–Seok, et al, "Highlight Separation and Surface Orientations for 3–D Specular Objects," *Pattern Recognition, 1990 10th International Conference,* pp. 331–335, (1990).

Wolf, Lawrence B., "Diffuse Reflection," *Computer Vision and Pattern Recognition,* pp. 472–478, (1992).

Foley, James D., et al, *Computer Graphics: Principles and Practices,* Addison–Wesley Publishing Co., 2nd ed. pp. 728–741, 754–758 and 772–775, (1990).

Montine, James L., "A Procedural Interface for Volume Rendering," *Visualization, Conference,* pp. 36–44, (1990).

*Primary Examiner*—Heather R. Herndon
*Assistant Examiner*—Rudolph J. Buchel, Jr.
*Attorney, Agent, or Firm*—Louis J. Percello; Ronald L. Drumheller

[57] ABSTRACT

Portions showing greater specular reflection of an object to be displayed are displayed with pixels whose opacity, $\alpha_i$, is emphasized according to the specular reflected component of a shading model, in which case the specular reflected component thus calculated for shading is also utilized for arithmetic operation of emphasized opacity, $\alpha_i$, and high-speed processing is sought through tabulating various variables such as $\alpha_s$ (an additional opacity introduced for emphasis by a specular reflected component), $\alpha_n$ (a primary opacity), and G (a gradient vector).

4 Claims, 4 Drawing Sheets

VOLUME RENDERING METHOD WHICH INCREASES APPARENT OPACITY OF SEMITRANSPARENT OBJECTS IN REGIONS HAVING HIGHER SPECULAR REFLECTIVITY

FIELD OF THE INVENTION

This invention relates to a volume rendering method for displaying the shaded two-dimensional projected image of an object 3-dimensionally on a display, and more particularly, to correction of highlighted representations of the surface of a semi-transparent object.

BACKGROUND OF THE INVENTION

In volume rendering for displaying technical or medical images 3-dimensionally on a display screen, highlighting by specular reflection on the surface of a semi-transparent object constitutes an important element for the operator's visual perception of the depth and surface features of a semi-transparent object.

In volume rendering, a stereoscopic image is usually generated by shading volumes by using a suitable shading model, weighing the volumes according to opacity, and projecting the volumes thus shaded according to the weights onto a screen.

By the conventional ray tracing method for volume rendering, a stereoscopic image is formed by projecting data about color- and opacity-assigned volumes obtained at a sampling point onto pixels on a screen.

EQUATION 2

$$Cpixel = \Sigma_{i=1} [C_i \, \alpha_i \, \Pi_{j=1}^{i-1}(1-\alpha_j)]$$

Cpixel: color value of pixel
Ci: color value at sampling point i
$\alpha_i$: opacity at sampling point i
$\alpha_j$: opacity at sampling point j The pixel color, Cpixel, is the sum of the data obtained at each sampling point i along a ray of light 2 transmitting through an object 1, as shown in FIG. 1.

In this connection, said Ci is determined by the following equation:

EQUATION 2

$$Ci = c \times Ka \, Ia + c \times \Sigma Kd(N \cdot Lj) Ij + \Sigma Ks(Rj \cdot V)^p Ij$$

Where
c: primary color value of object
Ka: ambient reflection coefficient
Kd: diffuse reflection coefficient
Ks: specular reflection coefficient
p: specular reflection emphasis coefficient
N: normalized gradient vector at sampling point
V: directional vector of viewpoint
Rj: directional vector of reflected light from sampling point for light source j
Lj: directional vector of light source j
Ij: intensity of light source j
Ia: intensity of ambient light In Equation 2 it may be considered that the first, second, and third terms correspond respectively to an ambient reflected component, a diffuse reflected component, and a specular reflected component, which are under the influence of various sorts of reflected light.

Apart from the above-mentioned method of weighing volumes according to opacity and projecting shaded volumes on a screen, the method of assigning colors and opacity according to materials brought out in the respective volumes is another well-known method, as disclosed in Official Patent Gazette No. 63-24478.

PROBLEMS WITH THE PRIOR ART

An important highlight in a human being's visual perception of the features of a semi-transparent object is that ascribed to specular reflection, wherein portions showing intense specular reflection, or portions providing strong highlighted representations, have to correspond to greater color values, as evident from Equation 2.

However, as evident from Equation 1, the opacity is greater on the surface of an opaque object and hence the color for the pixel value of a generated image takes a greater value, whereas the opacity is smaller on the surface of a semi-transparent object and hence the color for the pixel value of a generated image takes a smaller value.

In this respect, in the conventional volume rendering the opacity $\alpha$ is employed as it is at the above-mentioned respective sampling points irrespective of however large the specular reflected component is on the surface of an object. For this reason, it used to not be possible to represent the features of a semi-transparent object sufficiently because the opacity of a semi-transparent object is lower even though the specular reflected component of the surface may be larger and hence not enough highlighted representations are made on the surface.

OBJECTS OF THE INVENTION

An object of this invention is to provide sufficiently highlighted representation even of semi-transparent portions of an object in volume rendering.

SUMMARY OF THE INVENTION

A volume rendering method of this invention is characterized in that images of an object whose opacity is emphasized according to the magnitude of the specular reflected component are formed for portions showing greater specular reflection on the surface of the object, whereby the color values of portions showing greater specular reflection are amplified to give enough highlighted representation for semi-transparent objects as well.

Accordingly, this volume rendering method enables the color values of portions showing greater specular reflection to be amplified by heightening the apparent opacity, and thus enables enough highlighted representations to be given even for the features of a semi-transparent object.

Moreover, a volume rendering method of this invention emphasizes opacity in proportion to the magnitude of a specular reflected component.

Therefore, the volume rendering method of this invention provides sufficient highlighted representations according to the magnitude of specular reflection.

Furthermore, a volume rendering method of this invention calculates a specular reflected component for shading from volume data before emphasizing opacity by using the specular reflected component.

Therefore, the volume rendering method of this invention seeks to save arithmetic processing by using specular reflected components for shading and emphasis of opacity.

Furthermore, a volume rendering method of this invention determines emphasized opacity by a specific relational equation, prepares additional opacity in advance, primary opacity, and an adjustment function in tabular form to be used in the relational equation, and derives both opacity values from input volume data, on the one hand; and derives an adjustment function from the magnitude of a gradient vector for shading calculated from volume data, and determines emphasized opacity by using the adjustment function.

Therefore, the volume rendering method of this invention seeks to quicken processing by tabulating various values for use in the calculation of emphasized opacity.

The volume rendering method according to this invention enables highlighted representation of semi-transparent portions of an object to be sufficiently imaged by specular reflection and thus enables the display of images in such a way that the features of the object are easily ascertained, and also helps restrain processing time from increasing unreasonably and hardware resources from excessively growing through the sharing or tabulation of calculated values.

DETAILED DESCRIPTION OF THE INVENTION

The following describes in detail an embodiment of this invention.

This invention is worked by the use of a manifest computer system provided with hardware, such as a CPU, a memory device, and a display as well as loaded with basic software, and mounted as an application program on the computer.

This invention makes the use of any applicable shading model conceivable as long as it allows for a specular reflected component, though a Phong model is used in this embodiment.

Color data, $C_i$, at each sampling point in an object on a shading model and a pixel color, $C_{pixel}$, determined on the basis of the color data as well as opacity are determined by a manifest relational equation, as described above.

In this invention, the opacity, $\alpha_i$, at each sampling point for use in the determination of a pixel color, $C_{pixel}$, is emphasized according to each specular reflected component. In this embodiment, the opacity, $\alpha_i$, has been so set as to increase in proportion to the specular reflected component as represented by Equation 3.

EQUATION 3

$$\alpha_i \{\alpha_n, \alpha_s \times \Sigma K_s (R_j \cdot V)^p I_j\} \times G$$

Figure 4:
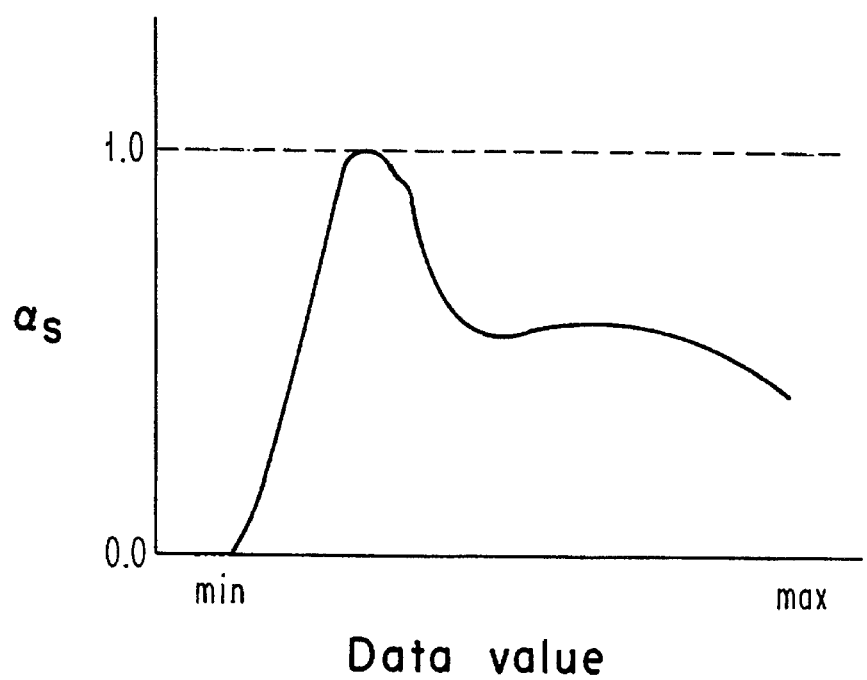
FIG. 4 is a graphic representation of the relationship between additional opacity and input data.

That is to say, $\alpha_s$ denotes additional opacity introduced for emphasis according to a specular reflected component. This additional opacity is set at a value determined by Equation 4 where the maximum of the specular reflected component is used as its denominator, a value which as been set so as to fall into the range $0<\alpha_s<1$, as shown in FIG. 4, depending on each input data value so that the target opacity should fall within the range $0<\alpha_i<1$ by setting such additional opacity.

EQUATION 4

$$\alpha_s = (1-\alpha_n)/\max(\Sigma\{K_s(R_j \cdot V)^p I_j\})$$

Figure 3:
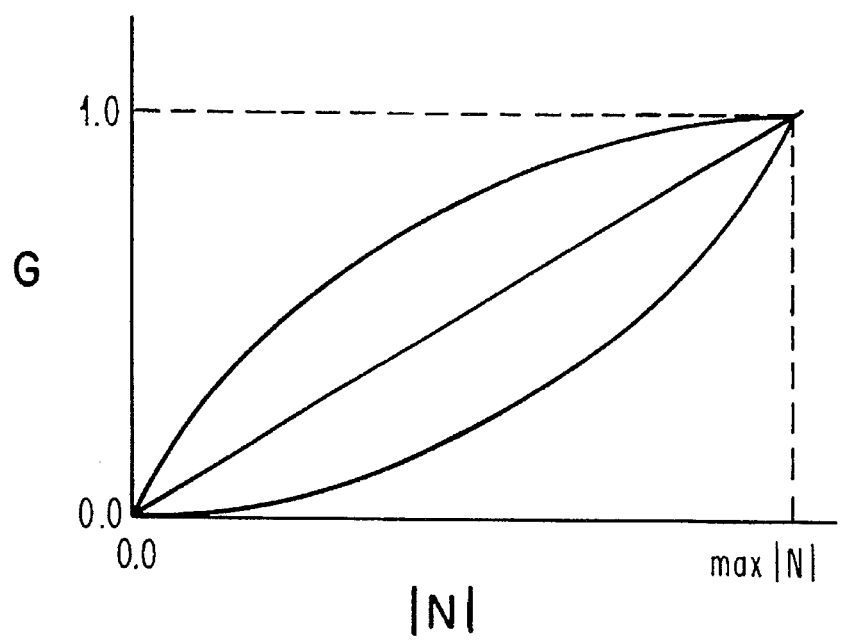
FIG. 3 is a graphic representation of the relationship between an adjustment function and gradient vectors.

Again, G is a function for adjustment (emphasis) of opacity by the magnitude, $|N|$, of a gradient vector at a sampling point, an increasing function ($0<G<1$, $|N|=0$: $G=0$, $|N|=1$: $G=1$) as shown in FIG. 3. If there is no change in volume and hence it is needless to emphasize opacity by the magnitude of a gradient, $|N|$, G may be set to 1 (a constant).

In this embodiment, a gradient vector is calculated as a normal vector for shading from volume data by smoothing, whereby the influence of noise included in the data is curbed. If input data includes much noise, a formed image may have spot-shape highlights formed because of specular reflection, but such discrepancies can be avoided by smoothing.

Figure 5:
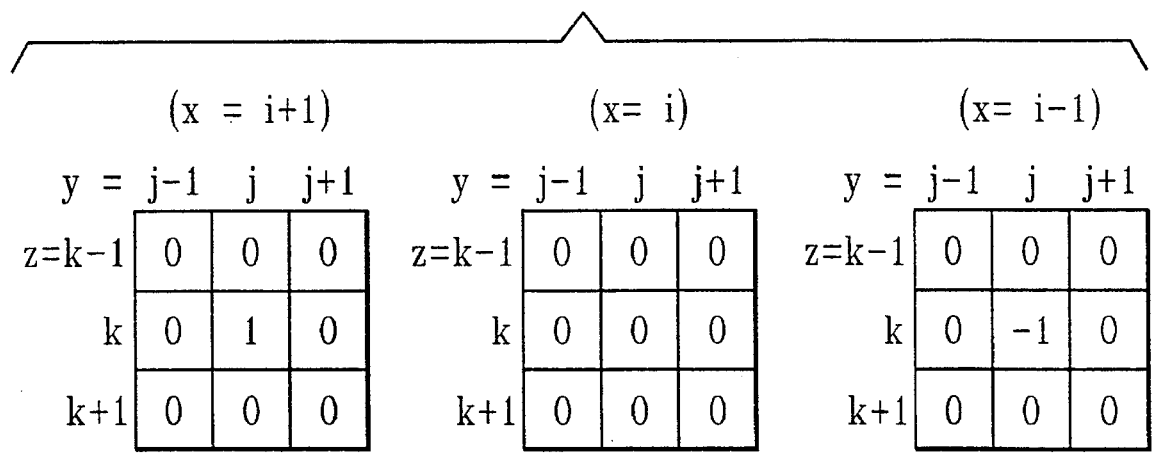
FIG. 5 shows the conventional operators determining a gradient vector.

Speaking specifically, the gradient vector, N (i, j, k), of any lattice point, (i, j, k), is calculated as follows:

Conventionally, for instance, the X-component of a gradient vector was induced as below from data, D, about surrounding lattice points by using the operators shown in FIG. 5:

$$N(i,j,k)x = D(i+1,j,k) - D(i-1,j,k)$$

Figure 6:
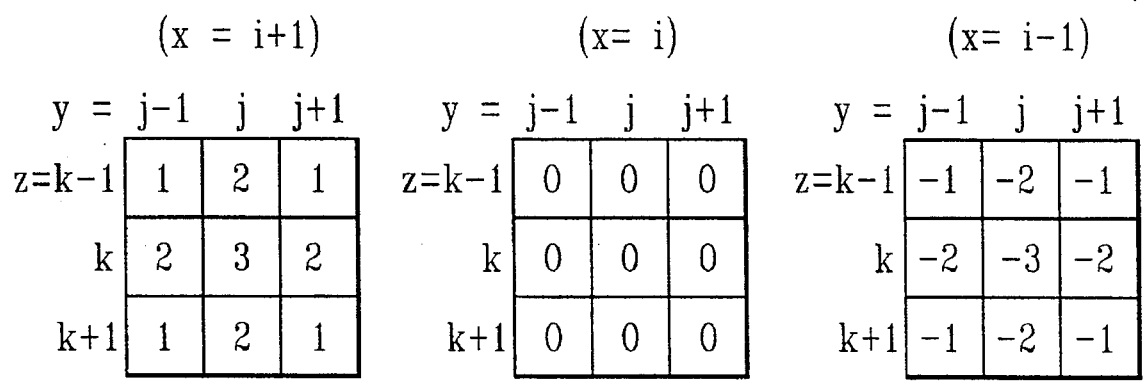
FIG. 6 shows the conventional operators determining a gradient vector.

In this embodiment, by contrast, the X-component of a gradient vector is calculated as below by using the operators shown in FIG. 6:

$$\begin{aligned}N(i,j,k)x = &\ D(i + 1, j, k + 1) + 2D(i + 1, j + 1, k) + \\ &\ D(i + 1, j + 1, k - 1) + 2D(i + 1, j, k + 1) + \\ &\ 3D(i + 1, j, k) + 2D(i + 1, j, k - 1) + \\ &\ D(i + 1, j - 1, k + 1) + 2D(i + 1, j - 1, k) + \\ &\ D(i + 1, j - 1, k - 1) - D(i - 1, j + 1, k + 1) - \\ &\ 2D(i - 1, j + 1, k) - D(i - 1, j + 1, k - 1) - \\ &\ 2D(i - 1, j, k + 1) - 3D(i - 1, j, k) - \\ &\ 2D(i - 1, j, k - 1) - D(i - 1, j - 1, k + 1) - \\ &\ 2D(i - 1, j - 1, k) - D(i - 1, j - 1, k - 1)\end{aligned}$$

That is, the X-component of a gradient vector is calculated in consideration of data about all surrounding lattice points so as to seek smoothing. This principle also applies to the Y-component and Z-component.

Figure 1:
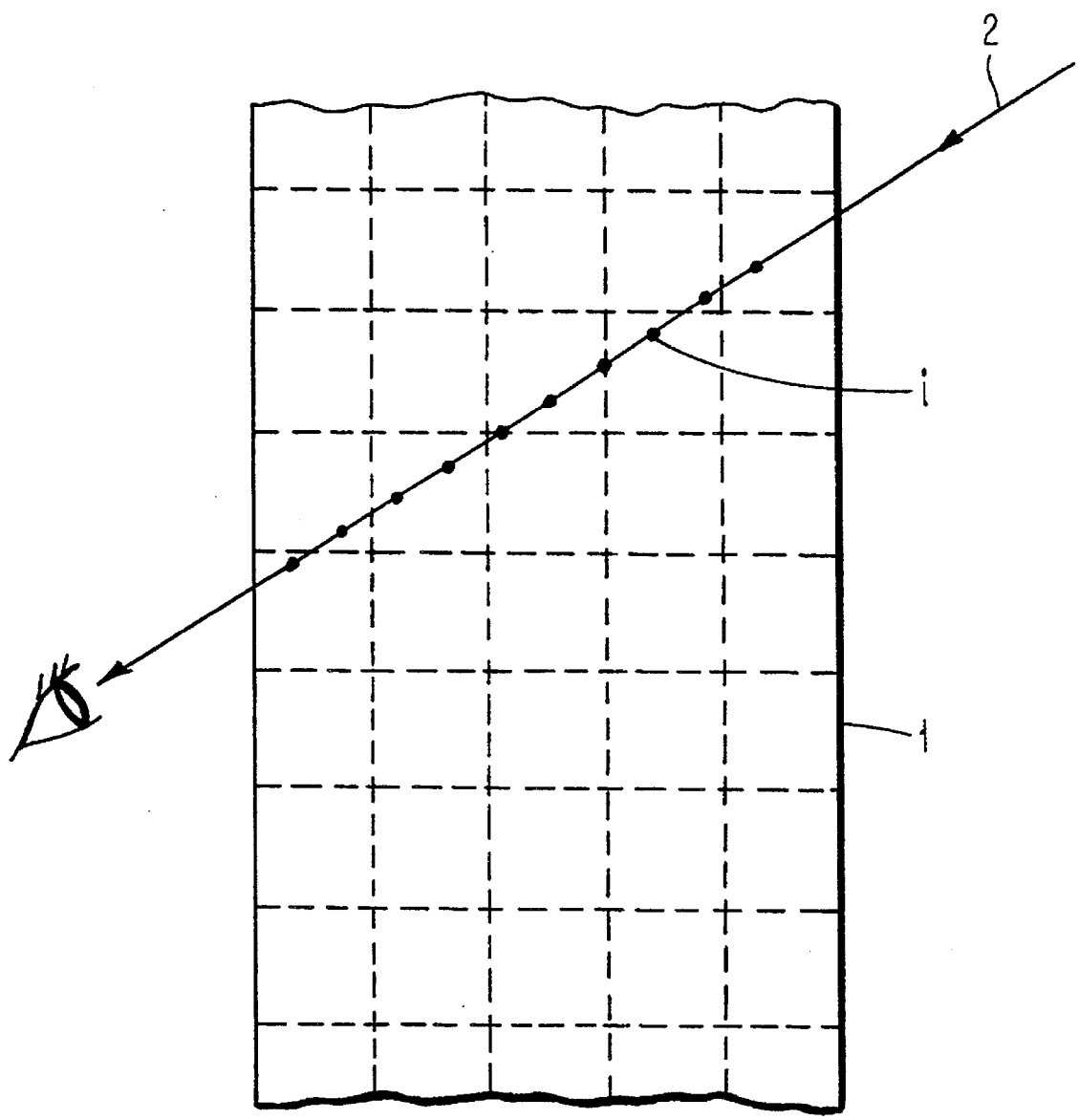
FIG. 1 is a conceptual drawing of sampling points.
Figure 2:
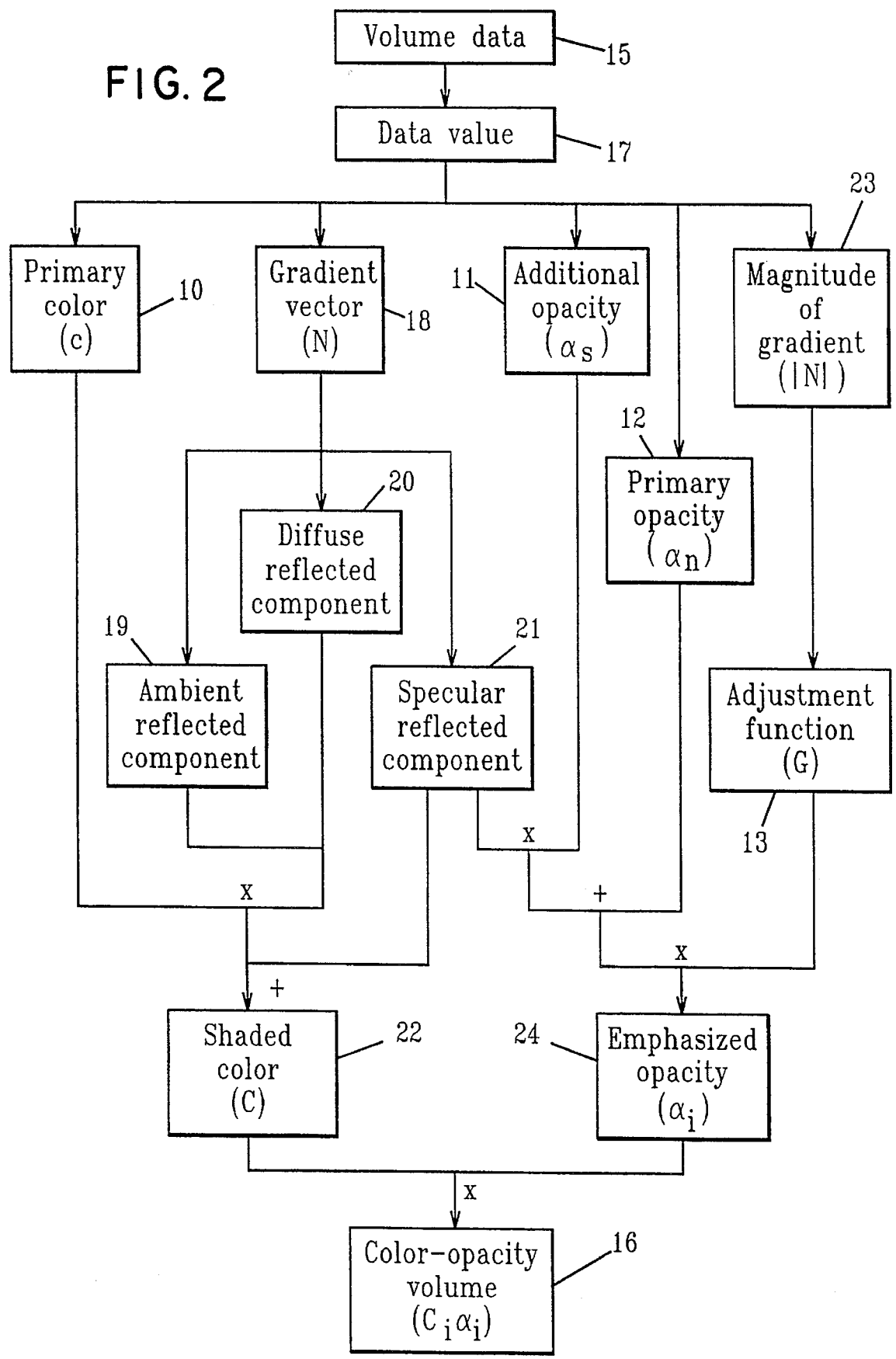
FIG. 2 is a block diagram of the processing procedure.

FIG. 2 shows an outline of the major processing relevant to this embodiment, where the primary color value, c, additional opacity, $\alpha_s$, primary opacity, $\alpha_n$, and adjustment function, G, of the above-mentioned pixel are provided beforehand, respectively, as predetermined tables 10, 11, 12, and 13.

As FIG. 2 shows, the obtainment of a color-opacity volume 16 from volume data 15 largely entails shaded color value determination and emphasized opacity determination.

On the one hand, the former process deduces the primary color value, c, at a corresponding sampling point from the table 10 on the basis of the data value 17 of the volume data 15 and calculates a gradient vector, n18, by using the above-mentioned operators. The former process then calculates the ambient reflected component 19, diffuse reflected component 20, and specular reflected component 21 shown in Equation 2 by using this gradient vector, n18, then multiplies the ambient reflected component 19 and diffuse reflected component 20 by the primary color value, c, and then adds them together with the specular reflected component 21 to determine the color value Ci 22 of sampling point i.

On the other hand, the latter process deduces corresponding additional opacity $\alpha_s$, and primary opacity, $\alpha_n$, from the tables 11 and 12 respectively, then calculates the magnitude, |N| 23, of the gradient vector, and then derives a corresponding adjustment function, G, from the table 13 on the basis of the calculation. The latter process then multiplies the specular reflected component 21 by the additional opacity, $\alpha^s$, then adds the primary opacity, $\alpha_n$, and then multiplies the result by the adjustment function, G, to determine emphasized opacity, $\alpha_i$ 24, of the sampling point i shown in Equation 3.

A color-opacity volume, Ci $\alpha_i$, is deducing from the color value, Ci, of a sampling point, i, and emphasized opacity, $\alpha_i$, determined as described above.

Subsequently, as shown in Equation 1, the product of opacity, $(1-\alpha_j)$, of each sampling point (i to i-1) up to the sampling point i along a reference ray of light is multiplied by Ci $\alpha_i$, the results of which are aggregated to determine color, Cpixel of a pixel, which pixel is projected on a display to display an adequately highlighted stereoscopic image.

In this connection, for the projection we have various well-known techniques available, e.g.: the ray tracing method, slice-by-slice method, and splatting method.

Although the processing procedure described above is subject to change, if only the specular reflected component 21 has been calculated before the calculation of emphasized opacity, $\alpha_i$, the specular reflected component thus calculated can be used both in the calculation of a color value, Ci, and in the calculation of opacity, $\alpha_i$, thereby enabling delays in processing to be avoided.

Also, by tabulating beforehand the values of additional opacity, $\alpha_s$, primary opacity, $\alpha_n$, and an adjustment function, G, respectively, in look-up tables 11, 12, and 13, the respective values can be referenced quickly.

Through the use of specular reflected components and the tabulation of variables as described above, opacity emphasis processing entails hardly any increase in processing time.

We claim:

1. A volume rendering method for imaging a shaded three-dimensional object from volume data comprising the steps of:

a. evaluating volume data representing a three-dimensional object at sampling points, including determining a value for the specular reflection component, if any, at the sampling points, the sampling points including a semi-transparent portion of the three-dimensional object;

b. deducing a color-opacity volume at each sampling point, the color-opacity volume being determined from a color at the sampling point and an emphasized opacity at the sampling point, the emphasized opacity at the sampling point being an opacity value between the actual opacity value at the sampling point and an opacity value of one and being increased above the actual opacity value at the sampling point in dependence upon the value of the specular reflection component at the sampling point;

c. determining a pixel color for each sampling point, the pixel color being determined from said color at the sampling point and a product of said emphasized opacities of said sampling points along a reference ray of light; and d. projecting the pixel colors onto a display screen to form an image of said three-dimensional object.

2. A volume rendering method, as set forth in claim 1, characterized in that the opacity of a portion of greater specular reflection on the surface of the object is emphasized in proportion to the specular reflected component.

3. A volume rendering method, as set forth in claim 1, characterized in that a specular reflected component for shading is calculated from volume data before the emphasized opacity at the sample points is deduced.

4. A volume rendering method, as set forth in claim 1, characterized in that emphasized opacity, $\alpha$ is determined by the following function of:

$$\alpha = \{\alpha_n + \alpha_s \times \Sigma K_s (R_j \cdot V)^P I_j\} \times G$$

where

KS: specular reflection coefficient

P: specular reflection emphasis coefficient

Rj: directional vector of reflection light from sampling point for light source j Ij: intensity of light source j $\alpha_s$: additional opacity introduced for emphasis by specular reflected component $\alpha_n$: primary opacity G: gradient vector, of which variables $\alpha_s$, $\alpha_n$, and G are prepared in tabular form beforehand; both opacity values are derived from input volume data, and the adjustment function is derived from the magnitude of a gradient vector for shading calculated from the volume data.

* * * * *